Feb. 9, 1926.                                              1,572,447
W. F. SCHROEDER
LOCATING CHART FOR VEHICLES
Filed August 14, 1925          3 Sheets-Sheet 2
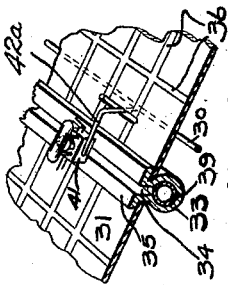
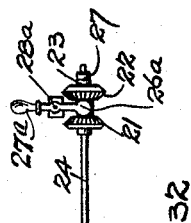
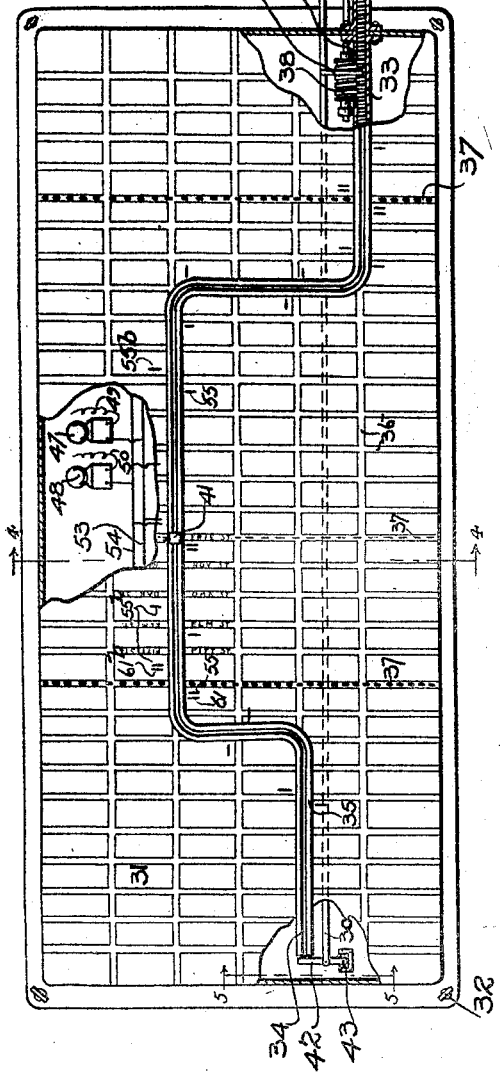
INVENTOR
Walter F. Schroeder.
BY
ATTORNEY

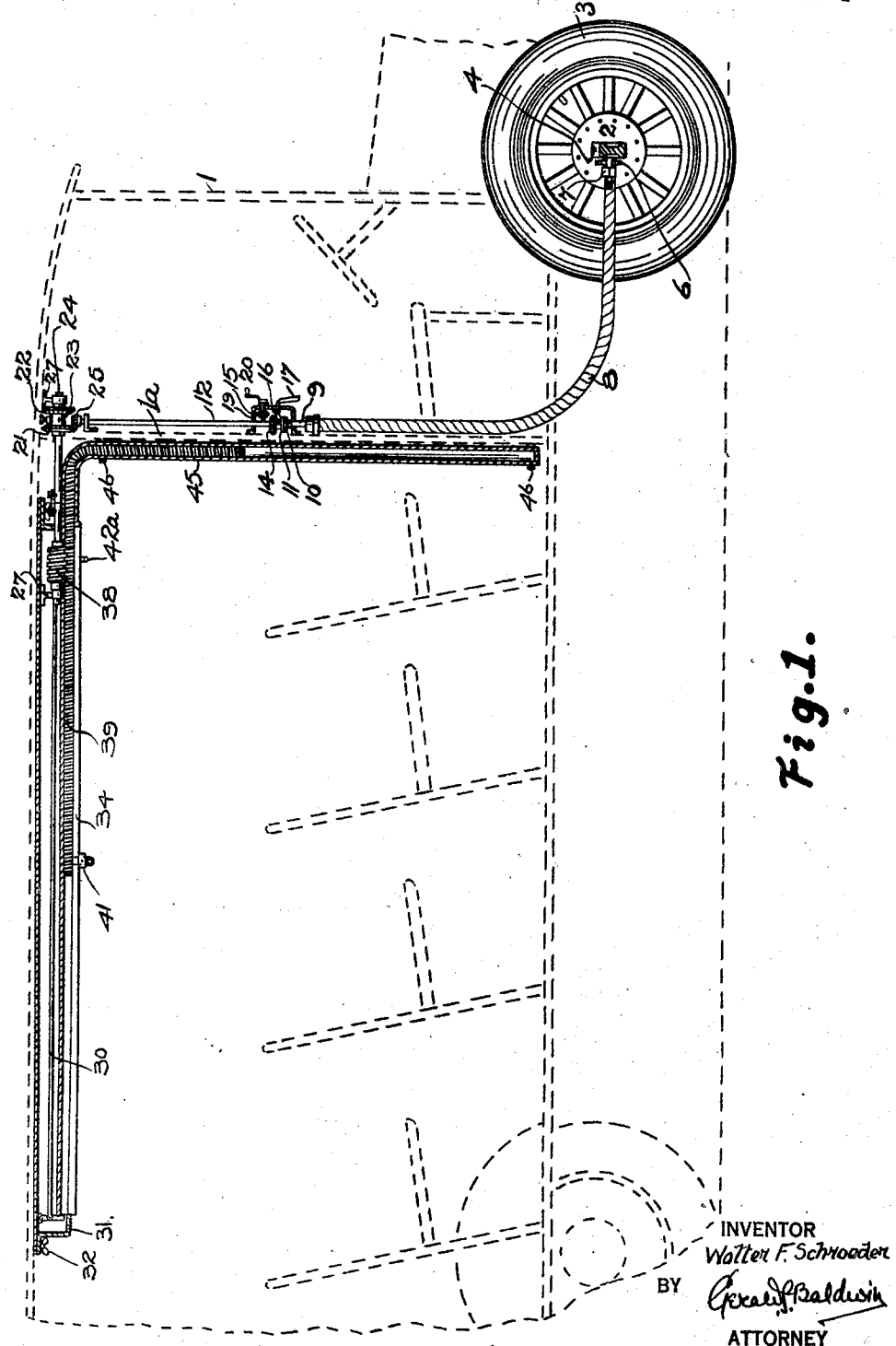

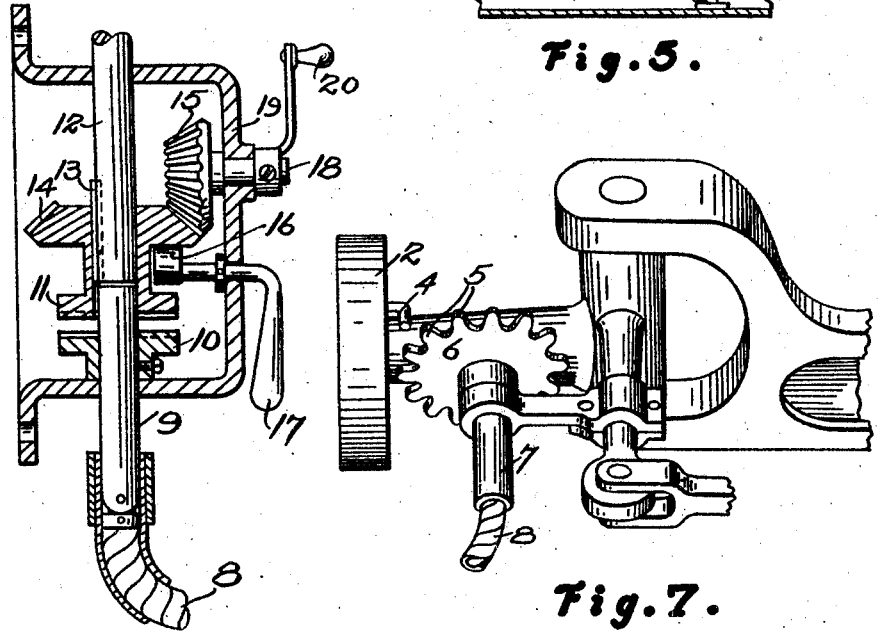

Patented Feb. 9, 1926.

1,572,447

UNITED STATES PATENT OFFICE.

WALTER F. SCHROEDER, OF DETROIT, MICHIGAN.

LOCATING CHART FOR VEHICLES.

Application filed August 14, 1925. Serial No. 50,236.

*To all whom it may concern:*

Be it known that I, WALTER F. SCHROEDER, a citizen of Germany, residing at Detroit, in the county of Wayne and State of Michigan, have invented a new and useful Locating Chart for Vehicles, of which the following is a specification.

This invention relates to improvements in locating charts for vehicles, and is primarily intended to be installed in omnibuses, street cars, or railroad cars, either on the roof or in some other convenient location, so that passengers may see at a glance the exact location of the vehicle at any time during the journey.

It is an object of the invention to provide a locating chart consisting of a chart or map of the territory through which the vehicle travels, and under the surface of the chart to arrange a tubular member having a continuous slotted opening more or less flush with the surface of the chart along the route followed by the vehicle. A pointer actuated by the rotation of the vehicle wheels and adapted to travel along the outer surface of the tubular member is provided to indicate the whereabouts of the vehicle at all times. Moreover the charts or maps are preferably made interchangeable so that if the vehicle is assigned to another route a map provided with a tubular member along that route may be substituted.

A second object of the invention is to provide a locating chart for vehicles wherein means are provided for reversing the direction of travel of the pointer either automatically or by hand, and also to provide means for setting the pointer if for any reason its location does not jibe with the location of the vehicle.

Another object of the invention is to provide a locating chart for vehicles having signal means such as bells which ring and lamps which are illuminated as the vehicle approaches stop and transfer points.

With these and other objects in view, which will be mentioned as the specification proceeds, the invention consists in certain novel construction and combination of parts hereinafter more fully described with the aid of the accompanying drawings and claimed.

Figure 1 is a diagrammatic view showing the invention installed in an omnibus.

Figure 2 illustrates a chart with the tubular member along which the pointer travels and part of the operating mechanism for the pointer.

Figure 3 shows a chart wherein the pointer travels round a more or less circular path, and is intended for belt lines.

Figure 4 is a section on the line 4—4 of Figure 2.

Figure 5 is a section on the line 5—5 of Figure 2.

Figure 6 shows the hand setting mechanism for the pointer.

Figure 7 shows the driving mechanism for the flexible shaft.

Figure 8 illustrates, among other things, a method of causing bells to ring and a light to be illuminated at various predetermined positions of the pointer, and Figure 9 is a detail.

Referring more particularly to the drawings, 1 designates an omnibus to which the invention is applied. On the plate 2 to which the wheel 3 is secured a contact finger 4 is fastened. Each time the wheel 3 and the plate 2 revolve the contact finger 4 strikes one of the teeth 5 on the gear 6 and causes the latter to turn. The rotation of the gear is transmitted through the connection 7 to the flexible shaft 8, the opposite end of which latter is connected to the shaft 9 on which the coupling 10 is arranged. The companion coupling 11 is mounted partly on the shaft 12, on which it is hled by the sliding key 13, and partly on the shaft 10. A gear 14 is usually integral with the upper end of the companion coupling 12. When the latter is in raised position the gear 14 meshes with a gear 15, and when it is in bottom position it engages the coupling 10. The companion coupling is raised and lowered by means of a cam 16 which is turned by the handle 17. The gear 15 is mounted on a shaft 18 supported by a casing 19, and an operating crank 20 is also supplied. At the upper end of the shaft 12 a pinion 25 is provided which cooperates with either of the gears 21 or 22 secured on the sleeve 23. The latter is slidably mounted on the shaft 24 supported by depending brackets 27.

Referring to Figure 2 it will be noted that an arm 26, which is pivotally attached to a member 28, is so shaped that its upper end is held against accidental movement by the spring 29, which exerts pressure through the free end of the arm against the gear against which the said arm bears and holds the gear in mesh with the pinion 25. A rod 30 is also pivotally mounted to the arm 26.

Referring to Figure 3 the gears 21 and 22 and the sleeve 23 are moved longitudinally on the shaft 24 by means of the handle 27$^a$ fulcrumed at 28$^a$. In this case no rod corresponding to the rod 30 in Figure 2 is employed, though the upper end of the handle 27$^a$ may be shaped similarly to the upper end of the arm 26 and a spring similar to the spring 29 utilized if desired. In practice however I find this is not necessary for this type of hand operated shifter.

31 indicates a chart which is secured to the roof of the vehicle by wing screws 32. Under the route on the chart followed by the vehicle a tubular member 33 is arranged. The later is provided with a longitudinal slot 34, and guides 35 integral with the member project outwardly on each side of the slot and over the chart. 36 designates streets, and other omnibus routes which cross the vehicle's route are indicated at 37.

A worm 38 on the shaft 24 meshes with spiral corrugations on the flexible element 39 which travels in the tubular member 33. For, as the stem 40, of the pointer 41 which passes through the slot 34, is secured to the flexible element towards its forward end, the said element cannot revolve, and is therefore moved lengitudinally by the rotation of the worm. In Figure 3 the flexible element is shown endless because, in the case of a belt line, the element is turned continuously round its path of travel. A portion of the tubular member 33 is cut away at 33$^a$ to allow the worm to cooperate with the flexible element, and the remaining portion of the member acts as a bearing for the side of the element opposite to the worm and prevents the element and the worm from becoming disengaged.

Referring again to Figure 2, as the forward end of the flexible element reaches the end of its travel it strikes the lever 42. The latter is fulcrumed at 43 and has the outer end of the rod 30 pivotally attached to it, so that by forcing the lever 42 outwards the reversing mechanism is operated. 42$^a$ designates a stop fastened to the rod 30 and is so positioned that the pointer 41 will strike it as it reaches the end of its travel nearest to the worm 38. Pressure of the pointer on the stop 42$^a$ then moves the rod 30 and again reverses the direction of rotation of the shaft 24.

44 is a coupling which may be employed to facilitate the removal of one chart and the installation of another as the total length of the shaft 24 may vary for different charts. To the edge of the chart 31 a tubular member 45 is attached in which the outer end of the flexible element is housed. The tubular member is preferably secured as by clips 46 to a wall 1$^a$ of the vehicle, and is usually removed with the chart.

Bells 47 and 48 are located under the chart, and are connected by leads 49 and 50 respectively to a source of energy 51 one side of which latter is grounded as shown at 52. The opposite sides of the bells are connected to leads 53 and 54. To the lead 54 spring members 55 are connected; the latter are so located as to momentarily engage a contact 56 mounted on the pointer as the latter passes them. The contact 56 is grounded through the tubular member as indicated at 60, so that as the spring members 55 strike the contact 56 the bell 48 rings. This signal is generally employed to warn passengers of an approaching stop.

On the pointer 41 a lamp 57 is arranged under a reflector 58. The lead 59 from the lamp is so placed that as the pointer moves it makes momentary contacts with the spring arms 61 connected to the lead 53. When this occurs the lamp is illuminated and the bell 47 rings. This circuit is generally completed to warn passengers of an approaching transfer point, and in the present instance is utilized in conjunction with the first named circuit. The two bells are preferably of different tones.

It will be noted that the contact 56 and lead 59 are hinged at 56$^a$ and 59$^a$ respectively so that they may be moved back out of the way when the pointer is travelling in one direction, because these contacts must be made just prior to reaching the transfer point or stop. On the opposite side of the tubular member 33 a second set of spring members 55$^b$ and 61$^b$ are located which strike the contact 56$^b$ and lead 59$^b$ when the latter are outstretched. The contact 56$^b$ and lead 59$^b$ are hinged similarly to the contact 56 and lead 59, and the spring members 55$^b$ and 61$^b$ are connected by wires (not shown) to the leads 54 and 53 respectively. When in use either the contacts 56 and 59 or the contacts 56$^b$ and 59$^b$ are swung back against the side of the pointer, though in Figure 8 all the contacts are shown outstretched.

The guides 35 may also be calibrated to any desired units of distance as shown at 65, so that the distance between various points along the route can easily be seen.

It is however understood that various signals and combinations of signals may be employed to suit the conditions and requirements under which the device is to operate.

While in the foregoing the preferred embodiment of the invention has been described and shown, it is understood that the construction herein specified is subject to such alterations as fall within the scope of the appended claims.

What I claim as my invention and desire to secure by Letters Patent is:—

1. In a locating chart for vehicles, the combination of a chart mounted in a vehicle, a tubular member in the chart under the line of travel of the vehicle, a longitudinal slot in said tubular member, a flexible element adapted to be moved through said tubular member by the rotation of one of the wheels of the vehicle, and a pointer connected to the flexible element.

2. In a locating chart for vehicles as described in claim 1, the combination wherein means are provided for reversing the direction of travel of the flexible element in the tubular member.

3. In a locating chart for vehicles as described in claim 1, the combination wherein means are provided for automatically reversing the direction of travel of the flexible element in the tubular member when the vehicle reaches the end of its route.

4. In a locating chart for vehicles as described in claim 1, the combination wherein means are provided for disengaging the drive of the flexible element.

5. In a locating chart for vehicles as described in claim 1, the combination wherein means are provided for moving the flexible element and setting the pointer by hand.

6. In a locating chart for vehicles, the combination of a chart mounted in a vehicle, a tublar member arranged under the line of travel of the vehicle in the chart, a longitudinal slot in said tubular member, guides integral with the tubular member adjacent to the longitudinal slot, a pointer adapted to move along the surface of the guides which are more or less flush with the surface of the chart, a flexible element adapted to move through the tubular member and having said pointer attached thereto, said flexible element being moved by the rotation of one of the wheels of the vehicle.

7. In a locating chart for vehicles, the combination of a chart mounted on a vehicle, a tubular member in the chart arranged under the line of travel of the vehicle, a longitudinal slot in the tubular member, a flexible element having spiral corrugations within the tubular member, a worm cooperating with the spiral corrugations, a pointer attached to the flexible element, and means operated by the rotation of one of the wheels of the vehicle for turning the worm.

8. In a locating chart for vehicles, the combination as described in claim 7, wherein a reversing mechanism consisting of an arm attached to a rod is adapted to be actuated by the flexible element to cause gears to move longitudinally on a shaft on which the worm is mounted, one of said gears becoming engaged by a driving pinion as said rod is moved in either direction.

9. In a locating chart for vehicles, the combination of a chart mounted in a vehicle, a tubular member in the chart under the line of travel of the vehicle, a longitudinal slot in said tubular member, a flexible element adapted to be moved through said tubular member by the rotation of one of the wheels of the vehicle, a pointer connected to the flexible element, an electric lamp mounted on said pointer, a contact from said lamp projecting laterally from said pointer, a plurality of contact members mounted on said chart adapted to engage the contact on the pointer as the latter passes and to close a circuit by means of which the lamp is illuminated.

10. In a locating chart for vehicles, the combination of a chart mounted in a vehicle, a tubular member in the chart under the line of travel of the vehicle, a longitudinal slot in said tubular member, a flexible element adapted to be moved through said tubular member, by the rotation of one of the wheels of the vehicle, a pointer connected to the flexible element, an electric contact projecting laterally from the pointer, and a plurality of contact members mounted on said chart adapted to engage the contact on the pointer as the latter travels and close a circuit by means of which a bell is rung.

WALTER F. SCHROEDER.